United States Patent
Clark et al.

(10) Patent No.: US 9,302,519 B1
(45) Date of Patent: Apr. 5, 2016

(54) SYSTEM FOR DETECTING MALFUNCTIONING EJECTORS IN THREE-DIMENSIONAL OBJECT PRINTING USING SPECULAR REFLECTANCE

(71) Applicant: Xerox Corporation, Norwalk, CT (US)

(72) Inventors: Raymond J. Clark, Webster, NY (US); Frank B. Tamarez Gomez, Webster, NY (US); Timothy P. Foley, Marion, NY (US); Paul S. Bonino, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/571,880

(22) Filed: Dec. 16, 2014

(51) Int. Cl.
*B41J 29/393* (2006.01)
*B41J 2/045* (2006.01)
*B41J 2/21* (2006.01)
*B33Y 30/00* (2015.01)

(52) U.S. Cl.
CPC .............. *B41J 29/393* (2013.01); *B41J 2/0451* (2013.01); *B41J 2/2142* (2013.01); *B33Y 30/00* (2014.12)

(58) Field of Classification Search
CPC ...... B41J 2/0451; B41J 2/2139; B41J 2/2142; B41J 2/16579; B41J 2002/165
See application file for complete search history.

(56) References Cited

U.S. PATENT DOCUMENTS

| | | | |
|---|---|---|---|
| 2004/0012112 | A1 | 1/2004 | Davidson et al. |
| 2006/0056699 | A1* | 3/2006 | Kusakari ................ B41J 2/2146 382/190 |
| 2006/0111807 | A1 | 5/2006 | Gothait et al. |
| 2006/0141145 | A1 | 6/2006 | Davidson et al. |
| 2009/0011066 | A1 | 1/2009 | Davidson et al. |
| 2010/0151136 | A1 | 6/2010 | Davidson et al. |
| 2013/0187974 | A1* | 7/2013 | Govyadinov ............ B41J 2/125 347/14 |

FOREIGN PATENT DOCUMENTS

WO       03/026876 A2     4/2003

* cited by examiner

*Primary Examiner* — Julian Huffman
(74) *Attorney, Agent, or Firm* — Maginot Moore & Beck LLP (57) ABSTRACT

A printer detects malfunctioning ejectors during printing of three-dimensional objects or two-dimensional printed matter. The printer operates the printhead or printheads in the printer to form convex drops of material on a substrate. A camera is positioned to minimize light reflections from the substrate into the camera. The camera is configured to generate image data of the light reflected from the substrate and specularly from the convex drops on the substrate. A controller analyzes the image data to identify malfunctioning inkjets.

21 Claims, 5 Drawing Sheets

SYSTEM FOR DETECTING MALFUNCTIONING EJECTORS IN THREE-DIMENSIONAL OBJECT PRINTING USING SPECULAR REFLECTANCE

TECHNICAL FIELD

The device disclosed in this document relates to printers that produce three-dimensional objects and, more particularly, to accurate detection of malfunctioning ejectors in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate to build objects of arbitrary shapes. Three-dimensional printing is distinguished from traditional object-forming techniques, which mostly rely on the removal of material from a work piece by a subtractive process, such as cutting or drilling.

The production of a three-dimensional object with these printers can require hours or, for large objects, even days. One issue that arises in the production of three-dimensional objects with a three-dimensional printer is consistent functionality of the ejectors in the printheads that eject the drops of material that form the objects. During printing of an object, one or more ejectors can deteriorate and eject the material at an angle from an intended direction; eject drops that are smaller than an ejector should eject; or fail to eject any drop at all. An ejector suffering from any of these operational deficiencies is known as a malfunctioning ejector. If the operational status of one or more ejectors deteriorates during object printing, it is not typically detected during printing. After the printing is completed, the defect may or may not be detectable, though it may have compromised mechanical integrity, esthetics, or other important qualities of the printed object. Consequently, print jobs requiring many hours or multiple days can produce objects that do not conform to specifications due to malfunctioning ejectors in the printheads. Once such defects are detected, the printed objects may have to be scrapped, restorative procedures applied to the printheads to restore ejector functionality, and the print job repeated. An apparatus that enables detection of malfunctioning ejectors while printing would enable restorative procedures to be applied during object printing so that a properly formed object can be produced. In this manner, product yield for the printer is improved and the overall printing process is performed more efficiently. The apparatus should be able to detect malfunctioning ejectors that eject a variety of materials, such as clear, colored, translucent, phosphorescent, soft, hard, any of a variety of polymers, and wax-based materials.

SUMMARY

An apparatus that enables malfunctioning ejector detection in three-dimensional printers includes a light source configured to direct light towards a substrate on which convex drops of material have been formed with drops of material ejected from a printhead, a camera positioned to minimize reflections of the light from the substrate into the camera and enabling specular reflections from the convex ink drops to be received by the camera, the camera being configured to generate image data corresponding to reflections of the light received from the substrate and the convex drops of material on the substrate, and a controller operatively connected to the camera and the light source, the controller being configured to operate the light source to direct light towards the substrate and the convex drops of material, to operate the camera to generate image data corresponding to reflections of light received from the substrate and the convex drops of material on the substrate, and to identify malfunctioning inkjets in the printhead with reference to the image data received from the camera.

A printer that incorporates the apparatus for detecting malfunctioning ejectors includes a printhead configured with a plurality of inkjets to eject drops of material onto a substrate and form convex drops on the substrate, a light source configured to direct light towards the substrate and the convex drops on the substrate, a camera positioned with reference to the substrate to minimize reflections of the directed light from the substrate into the camera and enabling specular reflections from the convex ink to be received by the camera, the camera being configured to generate image data corresponding to the light received from the substrate and the convex drops of material on the substrate, and a controller operatively connected to the light source, the camera and the printhead, the controller being configured to operate the printhead to eject a predetermined number of material drops from each inkjet onto the substrate to enable the predetermined number of material drops to form one of the convex drops on the substrate, to operate the light source to direct light towards the substrate and the convex drops of material on the substrate, to operate the camera to generate image data corresponding to the light received from the substrate and the convex drops of material on the substrate, and to identify malfunctioning inkjets in the printhead with reference to the image data received from the camera.

BRIEF DESCRIPTION OF THE DRAWINGS

The foregoing aspects and other features of an apparatus or printer that detects malfunctioning ejectors during three-dimensional printing are explained in the following description, taken in connection with the accompanying drawings.

DETAILED DESCRIPTION

For a general understanding of the environment for the device disclosed herein as well as the details for the device, reference is made to the drawings. In the drawings, like reference numerals designate like elements.

Figure 1:
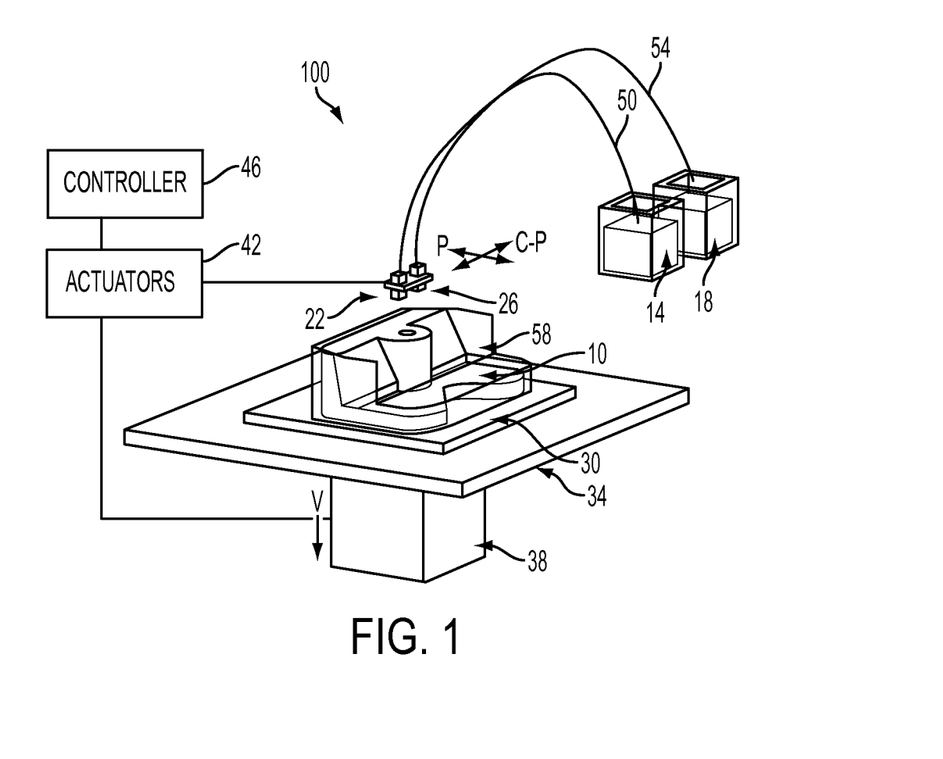
FIG. 1 is a perspective view of a three-dimensional object printer.

FIG. 1 shows a configuration of components in a printer 100, which produces a three-dimensional object or part 10. As used in this document, the term "three-dimensional object printer" refers to any device that ejects material with reference to image data describing a three-dimensional object to form that object. The printer 100 includes a support material reservoir 14, a build material reservoir 18, a pair of ejector printheads 22, 26, a build substrate 30, a planar support member 34, a columnar support member 38, an actuator 42, and a controller 46. Conduit 50 connects printhead 22 to support material reservoir 14 and conduit 54 connects printhead 26 to build material reservoir 18. Both ejector printheads are operated by the controller 50 with reference to three-dimensional image data in a memory operatively connected to the controller to eject the support and build materials supplied to each respective printhead. The build material forms the structure of the part 10 being produced, while the support structure 58 formed by the support material enables the build material to maintain its shape while the material solidifies as the part is being constructed. After the part is finished, the support structure 58 is removed by washing, blowing, or melting.

The controller 46 is also operatively connected to at least one and possibly more actuators to control movement of the planar support member 34, columnar support member 38, and the printheads 22, 26 relative to one another. That is, one or more actuators can be operatively connected to the structure supporting the printheads to move the printheads in a process direction and a cross-process direction with reference to the surface of the planar support member. Alternatively, one or more actuators can be operatively connected to either the planar support member 34 or the columnar support member 38 to move the surface on which the part is being produced in the process and cross-process directions. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 are configured with an actuator to move in a direction that is orthogonal to the planar support member 34. This direction is called the vertical direction in this document and is denoted with the letter "V" in FIG. 1. Movement in the vertical direction can be effected by one or more actuators operatively connected to the columnar support member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
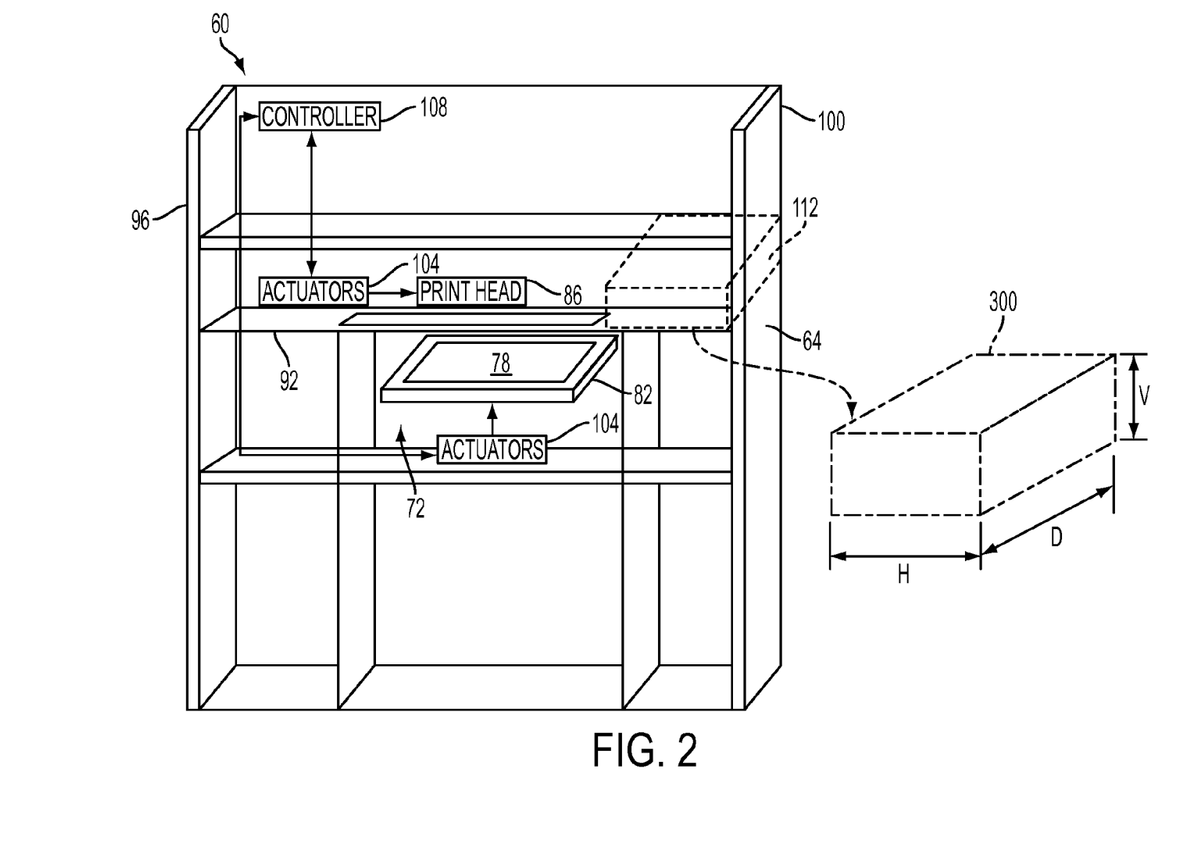
FIG. 2 is front view of a three-dimensional object printer having a housing that depicts a space within the housing for a module that enables malfunctioning ejectors in the printhead to be detected during a printing operation.

A three-dimensional object printer having a housing is shown in FIG. 2. That printer 60 has a housing 64. Within the housing 64 are six compartments that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three-dimensional object is formed. In some embodiments, the printhead 86 has a length that is approximately equal to the length of the planar support 78 in the direction from the back wall of compartment 72 to the opening at the front of the compartment. In these embodiments, printhead 86 is mounted on support member 92 in the space between sidewalls 96 and 100 of housing 64 for linear reciprocating movement only. In other embodiments, the printhead 86 has a length that is less than the length of the planar support 78 in the direction from the back wall of compartment 72 to the opening at the front of the compartment. In these embodiments, printhead 86 is mounted on support member 92 in the space between sidewalls 96 and 100 of housing 64 for reciprocating movement in two orthogonal directions in a plane above compartment 72. In these various embodiments, one or more actuators 104 are operatively connected to the printhead 86. Controller 108 operates the actuators 104 to move the printhead 86 either linearly back and forth on support member 92 or to move the printhead in two orthogonal directions within a plane. By selectively operating the ejectors in the printhead 86 and vertically moving the support platform 82 and horizontally moving the printhead 86 on the member 92, a three-dimensional object can be formed on the planar support 78.

The area 112 outlined in dashes in FIG. 2 identifies the placement of a module that uses specular reflectance from convex ink drops to detect malfunctioning ejectors in the printer 60. As noted above, if an ejector fails during printing of an object by either completely or partially failing to eject material or by errantly ejecting material in a skewed direction, the object being produced is malformed. Currently, this malformation cannot be detected until production of the object is finished. By using area 112 for sensing malfunctioning ejectors by evaluating specular reflections from drops of material ejected onto the surface of a substrate, printer 60 can be configured to detect malfunctioning ejectors during object production as described more fully below. Some components within the module 300 can move in the horizontal direction H, depth direction D, and vertical direction V as shown in the figure.

Figure 3:
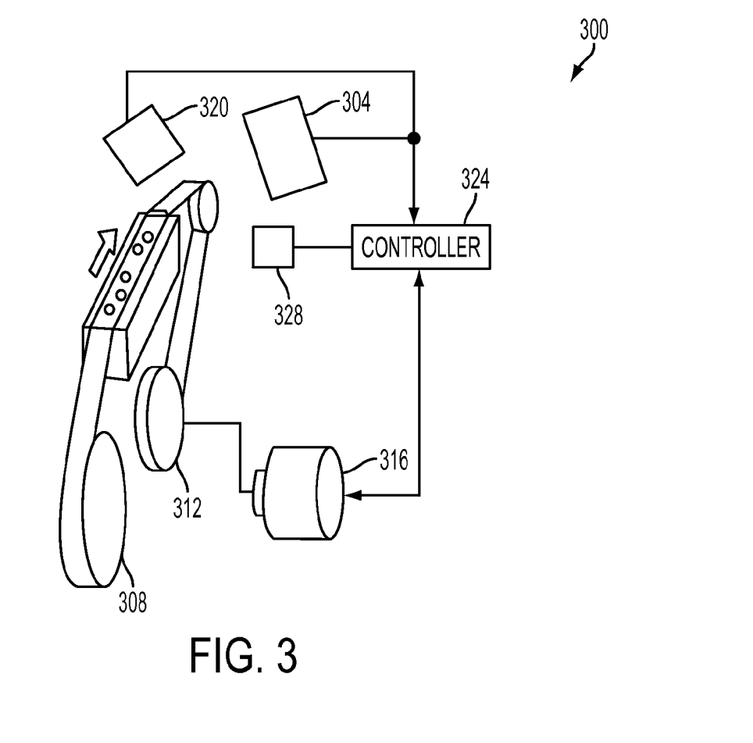
FIG. 3 is a perspective view of a module for detecting malfunctioning ejectors that fits in the space shown in FIG. 2.

One embodiment of a module that detects malfunctioning inkjets during object printing is shown in FIG. 3. The module 300 is configured to fit within area 112 of printer 60. The module 300 includes a camera 304, a supply roll of substrate on a roller 308, a take-up roller 312, one or more actuators 316, a light source 320 and a controller 324. The controller 324 is operatively connected to actuators 316 to drive the take-up roller 312 to pull substrate from the supply roller 308. The substrate on the roller 308 can be made of a material that supports the build material and the support material ejected from the printhead 86. For example, the substrate supply roll could be a roll of paper and, in some embodiments having a poorly collimated light source, the paper surface is rough to maximize diffuse reflection. Additionally, a rough surface minimizes specular reflections as well as reflections from the paper that narrowly deviate from the angle of incidence for the light from the collimated light source. Diffuse reflections are those reflections of light impinging on the paper that are spread in all directions equally so that only a small fraction of the light impinging on any point of the paper is reflected toward the camera, which is oriented to image the paper surface. The points of diffuse reflection appear relatively dark to the camera. Specular reflections from the smooth surfaces of the ejected drops on the paper enables a majority of the light impinging on a section of each drop to reach the camera. Consequently, a high contrast between the substrate and the drops is produced in image data generated by the camera. If the collimation of the light source is well controlled, then a smooth, glossy surfaced substrate may be superior to a rough substrate because the specular reflection from the glossy surface directs the majority of the light reflected from the substrate away from the camera as illustrated in FIG. 5B as explained below. This effect occurs because the specular reflections of the light impinging on the substrate are directed to a location other than the lens of the camera. Consequently, the field of view of the camera images a stark contrast between the bright spot of specular reflection on the drop and reflections from the surrounding drop portion and from the substrate that miss the camera lens.

As used in this document, "glossy" refers to a surface that reflects more specularly than diffusely on a macroscopic scale, that is for each light ray incident on the surface, the angle of incidence to the normal of the macroscopic surface of the object at the point of incidence is equal to the angle of reflectance to the same normal where macroscopic refers to an area large enough to ignore surface texture in determination of the normal. Also, as used in this document, "rough" refers to a surface that with the opposite property of glossy, namely, each light ray incident on the surface is reflected at an angle to the normal to the macroscopic surface at the point of incidence that is not equal to the angle of incidence to the same normal, and for which the distribution of reflection angles and reflection directions of all light rays tends toward a uniform three-dimensional hemispherical distribution. A point source of light refers to a light source that emits light from an volume that is very small relative to the size of the illuminated area and features of the illuminated area, and further being emitted with equal intensity towards all points of the that area. These properties have implications to the angle of incident and subsequent angle of reflection of light at each point in the scene. The material drops ejected from the inkjets land on the surface of the substrate and form a drop having a convex surface. This convex surface enables a portion of the drop approximated locally as a flat plane to reflect light specularly into the camera, while the remaining portions of the drop approximated locally as planes at different angles in three dimensions reflect light specularly as a function of each plane's angle to the incident light to places other than the camera. This difference results in most of each drop not directing light into the camera, while the portion of the drop whose local surface is at the appropriate angle efficiently directs light into the camera. This property of the convex drop enables each drop to be associated with a bright reflection surrounded by a relatively dark area. By using different types of substrates with different surface textures, the geometry must be constructed to minimize the amount of light reaching the camera after reflecting from the substrate while maintaining a clear path for specular reflections of the light source from the convex drops of material toward the camera. The convex surface of the drop approximating a portion of a sphere ensures that such reflections occur. Thus, by positioning a light source and a substrate as discussed below with reference to FIG. 5A and FIG. 5B, good contrast is produced in the image data generated by the camera so the positions of the drops can be identified and analyzed to identify malfunctioning inkjets.

The apparatus 300 relies upon the detection of specular reflections from drops of material ejected onto the substrate, which is pulled from the roller 308. As used in this document, "specular reflection" refers to a reflection of a light beam from a surface at an angle from a normal to the surface at the point of reflection that is equal to an angle of the incident light beam to the same normal. Specular reflections are produced by smooth relatively continuous surfaces having features that are small with respect to the wavelength of the incident light, such as the surface of a liquid drop of material ejected onto a substrate. Although the liquidity of the drop helps ensure the smoothness of the drop surface, this smoothness largely remains when the drop solidifies. The convex surface of the drop in three dimensions ensures that the normal to some point on the drop bisects the angle between a line extending to the illumination source and another line to the camera from that point. Thus, the specular reflection of the illumination source from that point to the camera enables the camera to capture most of the light reflected. Provided the properties of the substrate are well chosen, the light reflected from all other portions of the drop and the substrate miss the camera lens and appear much darker. In fact, the other portions of the drop as described, if the drop is perfectly specular, are visible only due to stray light in the environment impinging on those other portions of the drop at exactly the appropriate angle to be reflected specularly toward the camera. If such stray light is controlled to be at a much lower level than the light from the light source, then those other portions are much darker than the expected bright reflections of the source.

Figure 4:
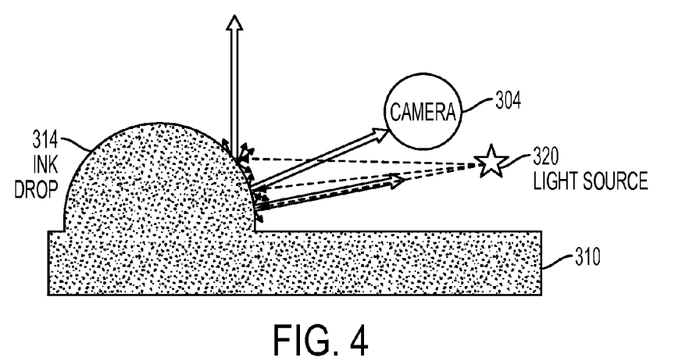
FIG. 4 is an illustration of a material drop producing a specular reflection from a collimated light source.

An illustration of this type of reflection is shown in FIG. 4 where a light source 320 directs a beam of light at a liquid drop 314 and a camera 304 receives the specular reflection of the incident beam. In the figure, the dashed lines represent the incident light rays traveling from the light source, which can be a collimated light source or a point light source, to the first object they encounter. The solid arrows represent reflected light rays and the broad and long solid arrows depict a majority of the specular reflections. The short arrows depict the small portion of the light reflected diffusely. Each specular reflection appears to the camera as a point of light since it is a reflection of the light source from the convex surface of each drop, which tends to reduce the apparent size of the light. As used in this document, a "collimated light source" is a light source that emits a beam of light in which the light rays are parallel so that they do not diverge significantly. In the embodiments disclosed in this document, the collimated light beam is sized and constrained to enable it to illuminate uniformly the entire area of the substrate on which the drop pattern has been ejected. Additionally, neither light radiating directly from the light source nor any specular light reflections from the substrate travels directly to the camera.

Figure 5A:
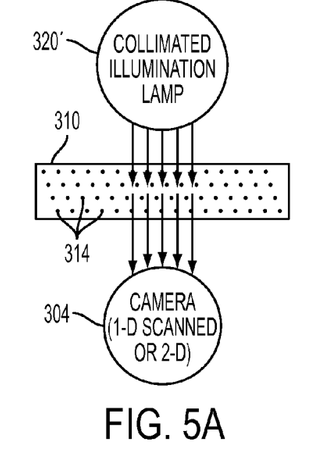
FIG. 5A is an illustration of a configuration of a camera and collimated light source that results in specular reflections from a substrate being reflected into the camera and FIG. 5B is an illustration of a configuration of a camera and collimated light source that results in the specular reflections from the substrate not being directed into the camera.
Figure 5B:
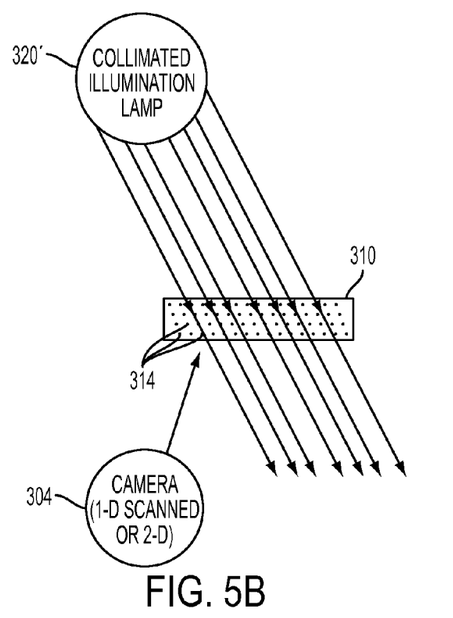

To avoid specular reflections of the light from the substrate reaching the camera, the camera in FIG. 3 needs to be positioned in a non-symmetrical manner as shown in FIG. 5B rather than the symmetrical configuration shown in FIG. 5A. In FIG. 5A, the collimated light source 320' and the camera 304 are positioned so an angle between a line from the light source to a normal to the substrate at some point is equal to the angle between the normal at that point and a line from that point to the camera. This configuration produces conditions in which light from the collimated light source is specularly reflected into the camera, limited only by the properties of the substrate. These specular reflections from the substrate are considered to be optical noise since they are not desired and are not distinguishable from the desired specular reflections of interest from the drops. This optical noise makes detection of the specular reflections from the drops 314 difficult because the specular reflections from the drops and the specular reflections from the substrate cannot be differentiated. To avoid this optical noise, the camera is move away from the axis of reflected light for all points on the substrate as shown in FIG. 5B. In this configuration, the specular reflections from the substrate miss the camera 304 while the specular reflections from the drops 314 can be viewed by the camera and captured in an image. The controller 324 can then analyze the image data generated by the camera. In this analysis, the positions of the bright points correspond to drops of material on the substrate. These positions can be compared to expected positions for the drops obtained from the image data used to operate the printhead to form the test pattern. Because the drop pattern is very well defined and formed with many drops, a geometric warping of the observed image can be derived and compensating image distorting transformations applied to the generated image to compensate for camera optical distortion and actual camera placement. Any positions where drops are expected that do not have a corresponding bright point indicate a malfunctioning inkjet. Points of light not reasonably close to expected positions are probably due to contamination on the substrate and can be ignored in the image analysis. Points of light plausibly close to the expected positions could be contamination or malfunctioning inkjets that ejected material drops off axis from the longitudinal axis extending through the ejector. Disposition of these slightly dislocated bright points can be delayed pending analysis of subsequent printings of the pattern. If the analysis of successive printings shows bright points in the same incorrect positions near the expected drop locations, then the ejector is identified as ejecting material off-axis. If these slightly errant points of light do not appear on subsequent printings, they are dismissed as noise. If an number of noise spots exceeds a predetermined threshold, a signal is generated that the system needs cleaning.

An alternative design approach employs a point light source, rather than a collimated light source, and an intentionally rough substrate that produces very little specular reflection. Instead, the rough substrate reflects the light diffusely and uniformly in all directions. Consequently, only a small fraction of the light reflected from any point on the substrate is directed towards the camera, whereas the majority of the light specularly reflected from some portion of the convex surface of each smooth drop is directed towards the camera. Almost no light is reflected from all other points on the smooth drop toward the camera. The diffuse reflections from the substrate and the specular reflections from the various portions of the drop results in a dark dot with a bright center in a dim field regardless of whether orientation of the light source and camera is as shown in FIG. 5A or FIG. 5B. The reader should understand that a very high roughness for the substrate is required to obtain these conditions. This configuration, however, is still inferior to the light and camera orientation depicted in FIG. 5B with reference to a glossy substrate, which ensures the specular reflection from the substrate is not received by the camera. The large specular component of the reflections from the substrate is certain to miss the camera and any remaining diffuse components are small and not significant. The advantage of this alternative is that it is easier to provide a broad point light source than a broad collimated source, however, this alternative is disadvantaged because the contrast is reduced. Thus, both rough and glossy substrates enable the portion of an ejected drop surrounding the bright spot of specular reflection from the drop to appear much darker than the portion of the drop specularly reflecting the collimated light.

Figure 6:
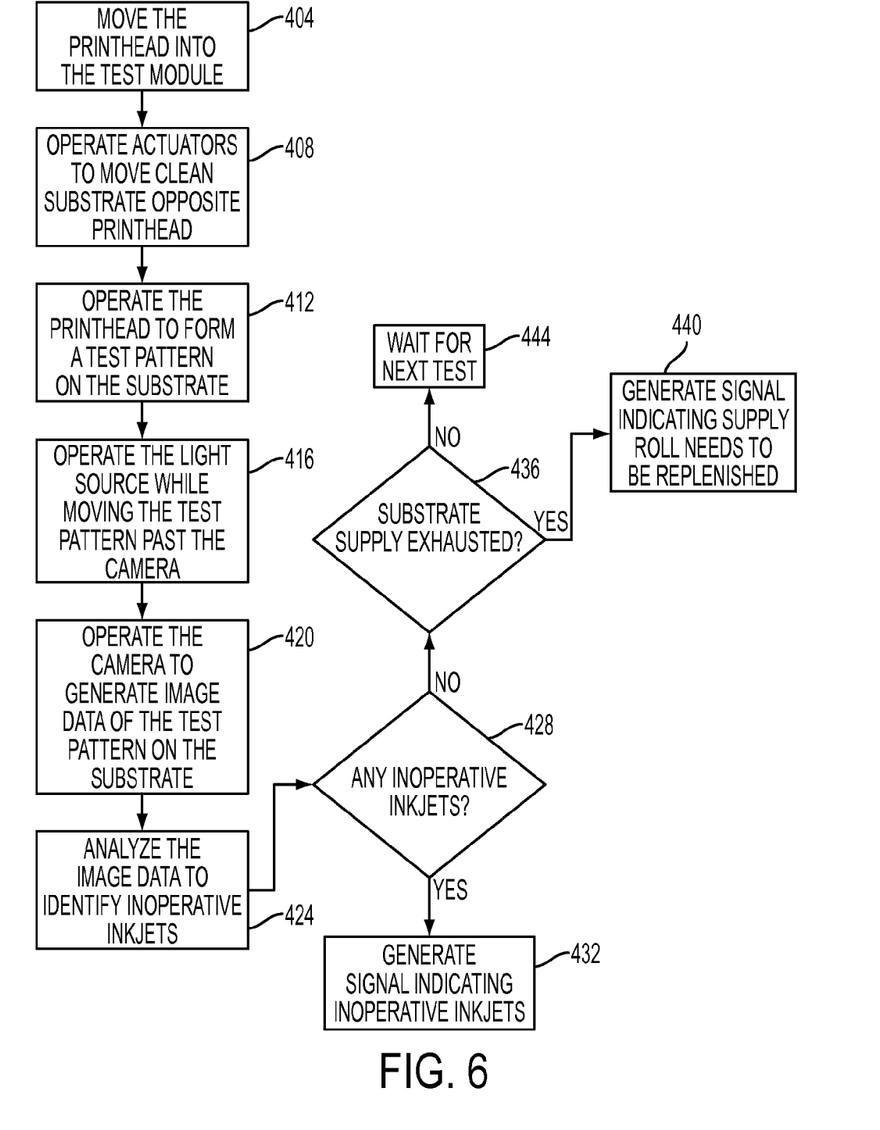
FIG. 6 is a flow diagram of a method for operating the module of FIG. 3.

A method of operating a printer that produces three-dimensional objects is shown in FIG. 6. In the description of this method, statements that a process is performing some task or function refers to a controller or general purpose processor executing programmed instructions stored in a memory operatively connected to the controller or processor to manipulate data or to operate one or more components in the printer to perform the task or function. The controller 324 noted above can be such a controller or processor. Alternatively, the controller 324 can be implemented with more than one processor and associated circuitry and components, each of which is configured to form one or more tasks or functions described herein.

At predetermined times in the printing operation, the controller 108 (FIG. 2) operates an actuator 104 to move the printhead 86 into the module 300 located in the area 112 (block 404). In response to the controller 324 (FIG. 3) detecting the printhead in the module 300, controller 324 operates an actuator 316 to rotate take-up roller 312 and pull a clean portion of the substrate from the supply on the roller 308 to a position beneath the printhead 86 (block 408). Controller 324 then generates a signal to the controller 108 to operate the inkjets in the printhead to print a test pattern on the substrate (block 412). In one embodiment, each inkjet in the printhead is operated one or more times to form a test dot on a portion of the substrate 308 opposite the inkjet. After the test pattern is printed, controller 108 moves the printhead 86 out of the module 300 and generates a signal for controller 324. In response to the signal from controller 108, controller 324 operates actuator 316 to move the printed portion of the substrate past the camera 304 while the controller 324 operates the light source 320 to direct light towards the substrate 308 (block 416). The camera generates image data corresponding to the bright points for the convex drops on the darker background of the substrate, which is reflecting only a small portion of the light, either specularly or diffusely, into the camera (block 420). These data that are received and analyzed by the controller 324 to identify malfunctioning inkjets (block 424) and, if malfunctioning inkjets are identified (block 428), a signal indicative of the defective printhead is generated for the operator of the printer or the printer controller (block 432). The operator or printer controller can then take appropriate action to remedy the malfunctioning inkjets. The controller 324 determines whether the substrate supply roll is exhausted (436) and, if the roll is exhausted, controller 324 generates a signal that the supply of substrate 308 on the roller is exhausted (block 440). An operator can then remove the take-up roll and replenish the substrate supply on roller 308. Otherwise, the process waits until the next test needs to be performed (block 444). Although the embodiments discussed above refer to a supply of substrate that is unwound to provide an area for the printing of a test pattern, other suitable substrates could be provided in the apparatus over which the one or more printheads can be moved and operated to form the test pattern. After the substrate and test pattern are imaged and the image data evaluated, the surface of the substrate can be cleaned for the printing of the next test pattern.

In one embodiment, the camera 304 is any two-dimensional image sensor with sufficient resolution to respond to the specular reflections from the drops that is capable of capturing an image quickly enough to meet the mechanical and illumination constraints of the system, while achieving a well-focused, high contrast, and low noise image. Depending on the characteristics of the ink, use of a heater 328 (FIG. 3) may be advantageous to maintain the material drops in a liquid state during this process. The heater 328 is activated by the controller 324 to maintain or return the drops to the liquid phase if the drops froze while the printhead was being removed from the module 300 or while the substrate 308 was moved to the imaging position. The heater 328 can be a convective heater or a radiant heater. In the case of materials that are cured through other methods, such as chemical or UV illumination, other mechanisms such as maintaining an atmosphere including or specifically lacking appropriate gasses may be helpful or required to maintain the liquid state during this process.

While the embodiments discussed above are within a printer that forms three-dimensional objects, the system that detects malfunctioning inkjets from the specular reflections of material drops can be used in two-dimensional document printing systems as long as the inks are not absorbed so completely into the paper that the paper roughness eliminates specular reflection. Thus, as used in this document, the word "material" refers to substances that can be used for printing documents as well as to form three-dimensional objects. In document printing systems, a supply of substrate can be maintained proximate to a printing zone and, from time to time, the printhead moved over a portion of the substrate pulled from that supply, printed, and imaged with the camera to identify malfunctioning inkjets. Alternatively, if the printed substrate is trimmed later in the document production process, the test drops can be ejected onto the portion of the substrate that is trimmed and discarded. Because the camera is positioned to capture the bright points of light produced by the specular reflections from the material drops while minimizing reflections of all types from the substrate into the camera, the camera is not susceptible to image noise that arises from low contrast between inks and substrates, as would otherwise be the case with clear material drops or with material drops having a color similar to the substrate, such as white or yellow on white paper.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer comprising:
   a printhead configured with a plurality of inkjets to eject drops of material onto a substrate and form convex drops on the substrate;
   a light source configured to direct light towards the substrate and the convex drops on the substrate;
   a camera positioned away from an axis of light reflected directly from the substrate to enable specular reflections of the directed light from the substrate to miss the camera and enable specular reflections of the directed light from the convex ink to be received by the camera, the camera being configured to generate image data corresponding to the light received from the substrate and the convex drops of material on the substrate; and
   a controller operatively connected to the light source, the camera and the printhead, the controller being configured to operate the printhead to eject a predetermined number of material drops from each inkjet onto the substrate to enable the predetermined number of material drops to form one of the convex drops on the substrate, to operate the light source to direct light towards the substrate and the convex drops of material on the substrate, to operate the camera to generate image data corresponding to the light received from the convex drops of material on the substrate, and to identify malfunctioning inkjets in the printhead with reference to the image data received from the camera.

2. The printer of claim 1 wherein the light source is a collimated light source and the substrate has a glossy surface.

3. The printer of claim 1 wherein the light source is a collimated light source and the substrate has a rough surface.

4. The printer of claim 1 wherein the light source is a point light source and the substrate has a rough surface.

5. The printer of claim 1, the substrate further comprising:
   a supply of substrate wound in a roll;
   a first roller, the supply of substrate being mounted about the first roller;
   a second roller to which a loose end of the supply of substrate is attached to enable substrate to be transferred from the first roller by rotation of the second roller;
   the actuator being operatively connected to the second roller and the controller, the actuator being configured to rotate the second roller; and
   the controller being further configured to operate the actuator to rotate the second roller and move a portion of the substrate past the printhead to the first position.

6. The printer of claim 5, the controller being further configured to detect the supply of substrate mounted about the first roller being exhausted and to generate a signal indicative of the supply of substrate being exhausted to enable the substrate wound on the second roller to be removed and another supply of substrate to be mounted about the first roller.

7. The printer of claim 1, the controller being further configured to identify inkjets that eject convex drops of material off axis with reference to the image data generated by the camera.

8. The printer of claim 1 wherein the printhead is configured to eject build material to form three-dimensional objects.

9. The printer of claim 1 further comprising:
   a heater configured to direct heat towards the convex drops of material on the substrate when the substrate is between the camera and the light source; and
   the controller is further configured to activate the heater to maintain or return the convex drops of material to a liquid phase after the drops of material have been ejected onto the substrate.

10. The printer of claim 9 wherein the heater is a convective heater.

11. The printer of claim 9 wherein the heater is a radiant heater.

12. An apparatus comprising:
    a light source configured to direct light towards a substrate on which convex drops of material have been formed with drops of material ejected from a printhead;
    a camera positioned to enable specular reflections of the directed light from the substrate to miss the camera and enable specular reflections of the directed light from the convex ink drops to be received by the camera, the camera being configured to generate image data corresponding to reflections of the light received from the substrate and the convex drops of material on the substrate; and
    a controller operatively connected to the camera and the light source, the controller being configured to operate the light source to direct light towards the substrate and the convex drops of material, to operate the camera to generate image data corresponding to reflections of light received from the convex drops of material on the substrate, and to identify malfunctioning inkjets in the printhead with reference to the image data received from the camera.

13. The apparatus of claim 12 wherein the light source is a collimated light source and the substrate has a glossy surface.

14. The apparatus of claim 12 wherein the light source is a collimated light source and the substrate has a rough surface.

15. The apparatus of claim 12 wherein the light source is a point light source and the substrate has a rough surface.

16. The apparatus of claim 12, the substrate further comprising:
    a supply of substrate wound in a roll;
    a first roller, the supply of substrate being mounted about the first roller;

a second roller to which a loose end of the supply of substrate is attached to enable substrate to be transferred from the first roller by rotation of the second roller;

an actuator operatively connected to the second roller and the controller, the actuator being configured to rotate the second roller; and the controller being further configured to operate the actuator to rotate the second roller to move a portion of the substrate past the printhead for formation of the convex drops.

17. The apparatus of claim 16, the controller being further configured to detect the supply of substrate mounted about the first roller being exhausted and to generate a signal indicative of the supply of substrate being exhausted to enable the substrate wound on the second roller to be removed and another supply of substrate to be mounted about the first roller.

18. The apparatus of claim 12, the controller being further configured to identify inkjets that form convex drops off axis with reference to the image data generated by the camera.

19. The apparatus of claim 12 further comprising:

a heater configured to direct heat towards the drops of material on the substrate when the substrate is between the camera and the light source; and the controller is further configured to activate the heater to maintain or return the drops of material to liquid phase after the convex drops of material are formed on the substrate.

20. The apparatus of claim 19 wherein the heater is a convective heater.

21. The apparatus of claim 19 wherein the heater is a radiant heater.

* * * * *